Dec. 13, 1927.
G. C. GOODE
FRONT WHEEL MOUNT
Filed May 9, 1924
1,652,780
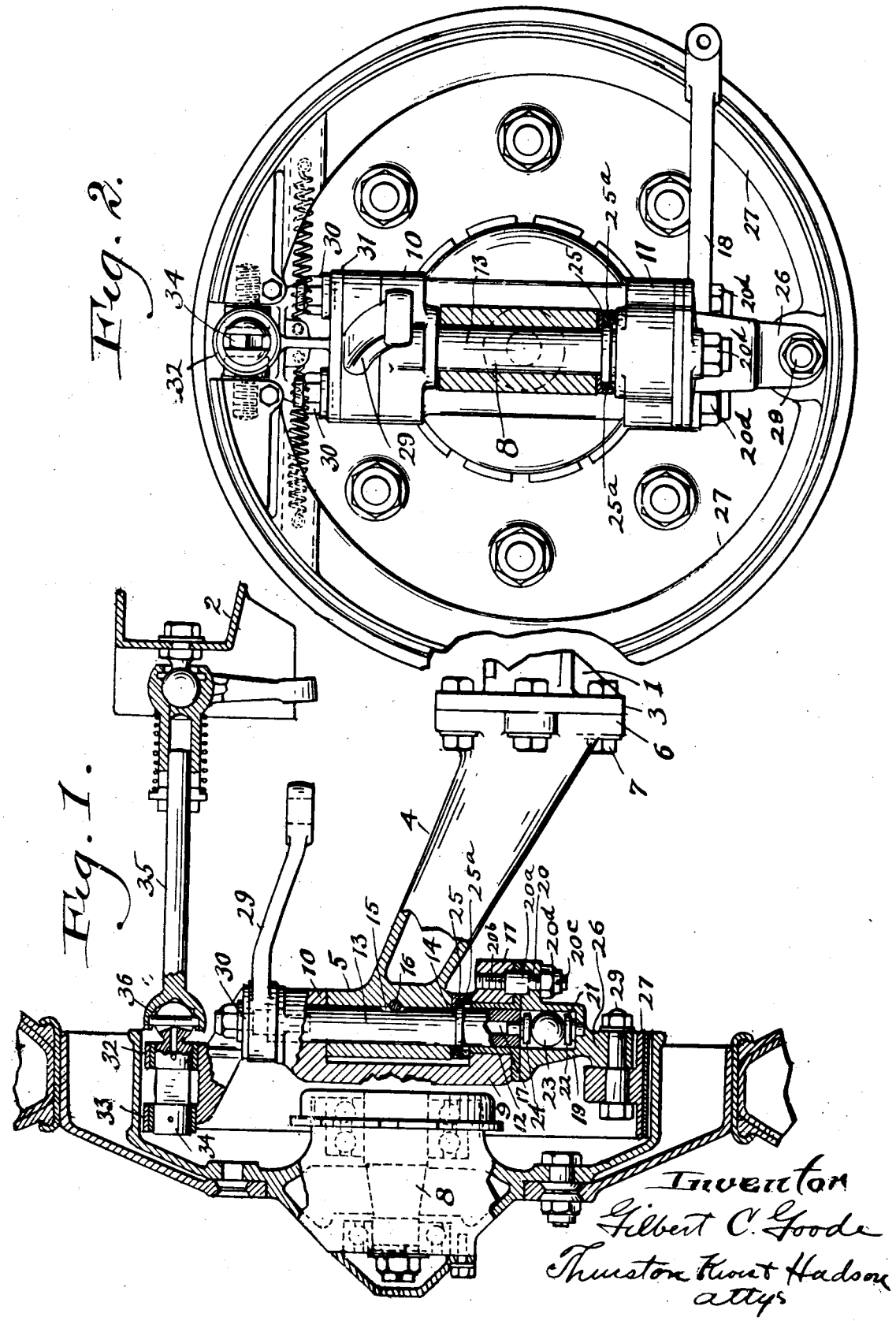

Patented Dec. 13, 1927.

1,652,780

UNITED STATES PATENT OFFICE.

GILBERT C. GOODE, OF BUFFALO, NEW YORK, ASSIGNOR TO THE WHITE MOTOR COMPANY, OF CLEVELAND, OHIO, A CORPORATION OF OHIO.

FRONT-WHEEL MOUNT.

Original application filed November 5, 1922, Serial No. 603,245. Divided and this application filed May 9, 1924. Serial No. 711,995.

This invention relates to the mounting of the front wheels of motor vehicles and more particularly to the steering knuckle construction, the objects of the invention being to provide a steering knuckle construction which has ample strength to withstand the rough usage to which it is subjected, which can be quickly assembled or taken apart and in which there is a minimum of frictional resistance to swinging movement.

The following description and accompanying drawings set forth in detail certain means embodying the invention, the disclosed means, however, constituting but one of the various mechanical forms in which the principle of the invention may be employed.

Reference should be had to the accompanying drawings forming a part of this specification in which Fig. 1 is a fragmentary view in vertical section showing the steering knuckle and portions of the wheel, axle and vehicle frame; Fig. 2 is a side elevation of the wheel hub and steering knuckle looking from the inside, a portion of the knuckle being shown in section.

In the accompanying drawings a fragmentary portion only of the vehicle is shown, the front axle being designated by the reference numeral 1 and the vehicle frame being designated by the reference numeral 2, the frame 2 being yieldably supported in the usual manner by means of springs from the axle. The axle 1 has a flange 3 at its end and an upwardly inclined extension 4 having a vertically disposed pivot pin receiving sleeve 5 at its outer end, and has a flange 6 at its inner end which is rigidly secured to the axle 1 by means of bolts 7 which pass through the flanges 3 and 6 of the axle and axle extension. When the brakes are carried by the front wheels on the spindles pivoted to the ends of upwardly inclined axle ends the axles are subjected to severe torque which tends to twist the axle at the bend between the straight central portion and the inclined ends. When the axle is integral from end to end it is necessary to make the axle very heavy to resist the twisting stresses. In the present invention, however, this difficulty is avoided by making the body of the axle and the inclined ends of separate pieces 1 and 4 and connecting them by bolting through the relatively wide flanges 3 and 6. By employing this construction the axle can be made of sufficient strength at the bend to resist the torsional stresses without making the axle unduly heavy. The spindle 8 has a vertically disposed integral knuckle portion 9 at its inner end from which extend upper and lower flanges 10 and 11 which fit over the upper and lower ends respectively of the pivot sleeve 5 and which have pin receiving apertures adapted to be aligned with the aperture in the sleeve 5. The aperture in the lower flange 11 is of slightly greater diameter than the aperture in the sleeve 5 and is adapted to receive a bushing 12, the internal diameter of which is the same as the internal diameter of the sleeve 5. A pivot pin 13 which has a shoulder portion 14 of enlarged diameter toward its lower end is adapted to be inserted through the apertures in the flange 11, sleeve 5 and flange 10, the shoulder portion 14 passing through the enlarged aperture in the flange 11 and engaging the lower end of the sleeve 5. The pivot pin 13 has a notch 15 in the side thereof adjacent its center which is engaged by a taper pin 16 which is inserted through a transverse aperture in the sleeve 5. The pivot pin 13 is preferably provided with an axial lubricant passage 17 therethrough through which lubricant may be supplied to the pin supporting bearings. After the pin 13 has been inserted the bushing 12 which has a flange overlying the underface of the flange 11 is slipped over the lower end of the pin 13. A lower steering arm 18, to the outer end of which the connecting member between the two front wheels of the vehicle is adapted to be attached, has an enlarged inner end 19 adapted to be secured to the underside of the flange 11 by means of bolts 20. Each bolt 20 has an enlarged middle portion 20ᵃ and reduced threaded ends 20ᵇ and 20ᶜ. The upper threaded ends 20ᵇ of the bolts are screwed into the flange 11 and the threaded lower ends 20ᶜ extend through the flange of the enlarged portion 19 of the steering arm which is held in place by nuts 20ᵈ. The enlarged middle portions 20ᵃ of the bolts fit in apertures in the flange of the bushing 12 and in counterbores in the contiguous portions of the flanges. This bolt connection is advantageous in that it offers ample resistance to shearing stresses and permits parts to be of lighter construction by reason of the smaller openings required for the ends of the bolt. The enlarged end 19 of the steering arm forms a supporting member for the pivot pin and has formed therein directly beneath the pivot pin a ball pocket 21. In the bottom of the pocket 21 is secured a hardened steel plug 22. A second hardened steel plug 24 has its stem fitting in the lower end of the axial passage 17 of the pivot pin and a head portion which rests upon a supporting ball 23 which in turn rests upon the plug 22 in the bottom of the ball pocket 21.

The weight of the vehicle is transmitted through the sleeve 5 to the shoulder 14 of the pivot pin and from the pivot pin to the supporting ball 23. The ball support for the pivot pin permits swinging movement of the wheel spindle with respect to the axle and offers a minimum of frictional resistance to such movement. A hardened steel cup 25 fits over the enlarged portion 14 of the pivot pin 13 and a ring of compressible material 25ª surrounds the shoulder 14 within the depending flange of the cup 25. The ring 25ª and cup 25 are of greater diameter than the aperture in the flange 11 and serve as a bearing between the sleeve 5 and flange 11. In assembling, the cup 25 with the ring 25ª therein is placed over the aperture in the flange 11 prior to the insertion of the pivot pin. An arm 26 extends downwardly from the enlarged portion 19 of the lower steering arm and is connected to the webs of pivoted expansible internal brake shoes 27 by means of a bolt 28 which also serves to pivotally connect the shoes 27. The upper steering arm 29 which is adapted to be suitably connected to the vehicle steering mechanism has its inner end rigidly secured upon the upper face of the knuckle flange 10 and is bored to receive the upper end of the pivot pin 13. The steering arm 29 is secured to the flange 10 by means of bolts 30 which pass through a bearing bracket 31 upon the upper face of the arm 29 and through the arm 29 into the knuckle flange 10. The bearing bracket 31 has a portion extending outwardly and upwardly from the base thereof and at its upper end has laterally spaced bearing portions 32 and 33 adapted to receive a rotatable brake operating member 34 which is operated through a telescopic shaft 35 extending therefrom to the vehicle frame which has a universal connection 36 with the member 34 directly over the pivot pin 13.

By reason of the connection 36 directly above the pivot pin 13 the removal of the ordinary pivot pin would be interfered with. The present invention, however, permits the pivot pin to be removed through the lower end of the knuckle, making it unnecessary to remove any of the brake operating parts.

This application is a division of my application, Serial No. 603,245, filed Nov. 5, 1922.

Having described my invention I claim—

1. The combination with a rigid axle having a pivot receiving sleeve, of a wheel receiving spindle having a knuckle portion with flanges extending over the top and bottom of the sleeve, a pivot pin having a shoulder adapted to engage the bottom of the axle sleeve and extending through the sleeve and into the flanges of the spindle to form a pivot therefor, and a removable pin retaining member carried by the lower flange of the spindle, said pin being removable through said lower flange.

2. The combination with a rigid axle having a pivot receiving sleeve, of a wheel receiving spindle having pivot receiving flanges extending over the top and bottom of the sleeve, a pivot pin adapted to be inserted through the lower spindle flange, and sleeve, and into engagement with the upper spindle flange, and a steering arm removably attached to the lower spindle flange, said arm having a thrust bearing for said pivot pin.

3. In a motor vehicle, the combination with a rigid axle having a vertical pivot receiving sleeve at the end thereof, of a wheel receiving spindle having a knuckle portion with flanges extending over the top and bottom of said sleeve, a pivot pin extending through said sleeve and engaging the flanges, said pivot pin having a shoulder adapted to be engaged by the bottom of said axle sleeve and the lower flange having an opening through which the pin may be inserted, a member detachably secured to the lower flange of the spindle, said member having a ball receiving pocket beneath the pivot pin, and a ball in said pocket upon which the lower end of said pivot pin rests.

4. In a motor vehicle, the combination with a rigid axle having a vertical pivot receiving sleeve at the end thereof, of a wheel receiving spindle having a knuckle portion with flanges extending over the top and bottom of said sleeve, said flanges having apertures adapted to be aligned with the aperture in the sleeve, the aperture in the lower flange being of greater diameter than the sleeve aperture, a pivot pin adapted to be inserted through the aperture of the lower flange into the sleeve and upper flange, said pin having a shoulder of enlarged diameter adapted to pass through the enlarged aperture of the lower flange and abut against the lower edge of the sleeve, a bushing adapted to fit over the pivot pin within the aperture of the lower flange, a retaining member detachably secured to the under side of said lower flange and having a ball receiving pocket, and a ball in said pocket upon which the lower end of said pivot pin rests.

5. In a motor vehicle, the combination with a rigid axle having a vertical pivot receiving sleeve at the end thereof, of a wheel receiving spindle having a knuckle portion with flanges extending over the top and bottom of said sleeve, a pivot pin extending through said sleeve and flanges, said pivot pin having a shoulder adapted to be engaged by the bottom of the axle sleeve and the lower knuckle flange having an opening of a diameter greater than said shoulder, a wheel on said spindle and a steering arm having an enlarged portion rigidly and detachably secured to the under side of said lower knuckle flange, said enlarged portion of the arm having a ball receiving pocket with a ball therein upon which the pivot pin rests, said steering arm also having an integral extension forming a support for a brake shoe.

In testimony whereof, I hereunto affix my signature.

GILBERT C. GOODE.